United States Patent
Conti et al.

[11] Patent Number: 5,944,214
[45] Date of Patent: Aug. 31, 1999

[54] REUSABLE LID AND CONTAINER

[75] Inventors: Rino Conti, Stoughton, Mass.; Gorm Bressner, Providence, R.I.

[73] Assignee: Plastican, Inc., Leominster, Mass.

[21] Appl. No.: 08/881,188

[22] Filed: Jun. 24, 1997

[51] Int. Cl.[6] .................................................. B65D 43/06
[52] U.S. Cl. .......................... 220/304; 220/265; 220/326; 206/508; 215/330; 215/354
[58] Field of Search ..................................... 215/211, 213, 215/214, 216, 217, 250, 330, 354, 356; 220/265, 304, 326; 206/508

[56] References Cited

U.S. PATENT DOCUMENTS

| | | | |
|---|---|---|---|
| 4,005,799 | 2/1977 | Mannaerts | 220/288 |
| 4,105,135 | 8/1978 | Bradshaw et al. | 220/288 |
| 5,207,345 | 5/1993 | Stewart et al. | 220/254 |
| 5,211,304 | 5/1993 | Stolzman | 220/304 |
| 5,562,218 | 10/1996 | Hamilton et al. | 215/221 |

*Primary Examiner*—Stephen K. Cronin
*Attorney, Agent, or Firm*—Pandiscio & Pandiscio

[57] ABSTRACT

The combination of a reusable lid and a container, the lid being provided with external threads and the container being provided with internal threads adjacent its upper end for mating with said external threads. The lid is assembled to the container by engagement of the external and internal threads on the lid and container respectively. Preferably the lid has a sealing ring disposed adjacent to the underside of an outer peripheral ledge for engagement with a selected portion of the container, so as to tightly seal off the contents of the container. A latch element is formed on the lid for engagement with a cooperating catch element formed on the container. The latch element prevents removal of the lid from the container until the latching element is released from the catch element.

26 Claims, 7 Drawing Sheets

REUSABLE LID AND CONTAINER

This invention relates to sealed containers such as a bucket or pail having a removable lid or cover. More particularly this invention is concerned with reusable covers or lids for containers which are capable of providing a sealed closure to preserve the contents of the container and also can be repeatedly assembled to and removed from the container.

BACKGROUND OF THE INVENTION

Sealed containers are widely used for the storage and transportation of liquid and solid materials. For materials that may need only short term storage, and may be relatively stable, it is common to provide containers that consist of a plastic pail or bucket having a removable lid. For some applications, the lids may be single use, i.e. they may be thrown away after the container has been opened, typically because all of the contents of the container are dispensed after the lid is removed.

For other applications a reusable lid must be provided, for example, when it is desired to use only a portion of the contents of the container and to then store the partially filled container for future use. In the case of material in granular or powder form, the reusable lid may have to make a secure fit, so as to prevent leaking of the contents of the container after the lid has been reapplied.

There is a further concern if the container is filled with material that is toxic or irritating to the skin and is used in or around a residence where small children are present, since their curiosity may cause them to remove the lid to view the contents of the container. Government regulations and industry requirements demand use of a reusable lid that is adapted to make a substantially leak-proof fit with the container and is difficult for children to remove, either accidentally or purposefully.

It also is desirable to have a tamper-evident means for indicating if a container has been opened.

A multiple use lid or closure for containers has been proposed and described in U.S. Pat. No. 5,207,345, issued to Gene L. Stewart et al. The closure described in that patent includes an adapter which is engagable with the top rim of a bucket, and a lid which is threaded into the adapter. Such a two part closure constitutes a more complicated solution to the problem of providing a means for re-closing and re-sealing a container after it is opened, than would be provided with a single lid serving as a closure.

SUMMARY OF THE INVENTION

Therefore, one object of the invention is to provide a reusable lid for a container which can be repeatably re-applied to provide a secure closure that prevents loss of the contents from the container.

Another object of the invention is to provide a reusable closure means for containers which is difficult for children to remove yet is user-friendly to senior citizens, and which is designed to securely seal the container so as to prevent loss of its contents.

A further object of the invention is to provide a reusable lid for a container for solids in powder or granular form which provides a secure seal regardless of the number of times the lid is re-applied.

Another object is to provide a reusable lid/container combination which includes means for centering the lid relative to the container so as to provide an easier assembly of the lid to the container.

A still further object is to provide a container and a reusable screw-type lid for the container wherein the lid is formed so as to screw into the container to form a secure seal, and also is adapted for repeated removal from and attachment to the container.

In a preferred embodiment of the invention, the foregoing objects are attained by providing a container/lid combination wherein the container has internal threads near its top end, and the lid is externally threaded. The lid is sized so that it can be screwed into the container to a position where a leak-proof seal is formed between the lid and the container. In addition, the lid is provided with latch means which contact catch means on the exterior of the container to securely retain the lid on the container.

In a preferred embodiment of the invention, a leak-proof seal to prevent loss of the contents in the container is provided by a first bevel surface at the upper inside edge of the container which mates with a sealing member on the lid when the latter is screwed into the top of the container. Additionally, the leak-proof seal may be improved by a second bevel surface on the inside of the container below the threads and an outer depending skirt on the lid which will seat upon the second bevel surface when the lid is screwed into the container. The new container/lid combination provided by this invention also may be provided with tamper-evident means.

Other features and advantages of the invention are set forth in or rendered obvious by the following detailed description of a preferred embodiment of the invention, which is to be considered together with the drawings hereinafter described.

BRIEF DESCRIPTION OF THE DRAWINGS

In the drawings, like parts and elements thereof are identified by like numerals.

DETAILED DESCRIPTION OF THE INVENTION

A preferred embodiment of the safety lid of the invention is shown in FIGS. 1–4. The lid 2 is circular to complement the shape of a circular container which, for example, may take the form of a pail or bucket 110 (FIGS. 5–9) which has a bail (not shown). Both the lid and the pail are molded of a plastic material that is relatively stiff yet resilient enough to allow limited flexing, e.g, polyethylene or another moldable thermoplastic resin.

Lid 2 is formed with a main body portion 6 which has a skirt 10 (FIGS. 2, 3) depending from the outer periphery thereof. Body portion 6 is joined to an outer ledge or flange 14 that projects radially outward beyond the periphery of skirt 10. Ledge 14 extends generally perpendicular to skirt 10. The latter has an external diameter less than the internal diameter of the top of the pail into which the lid is to be assembled. Two diametrically opposed half threads 18 are formed on the outer surface of skirt 10. As used herein, the term "half thread" means a thread that extends close to but more than 180° around the lid, preferably about 190°, whereby the trailing end of one of the two half threads overlaps the leading end of the second half thread by a few degrees.

A retention ring 22 is formed on the outer surface of lid 2 at its upper end. Ring 22 is spaced below ledge 14. Also the outer diameter of ring 22 is less than that of ledge 14. The configuration of the outer surface of lid 2 between ring 22 and ledge 14 is such as to provide an annular recess 26 (FIG. 3) into which a resilient O-ring seal 30 is located. O-ring seal is preferably made of a chemically-resistant elastomer and its use is optional depending upon the quality of contents sealing required by law or the user.

Figure 1:
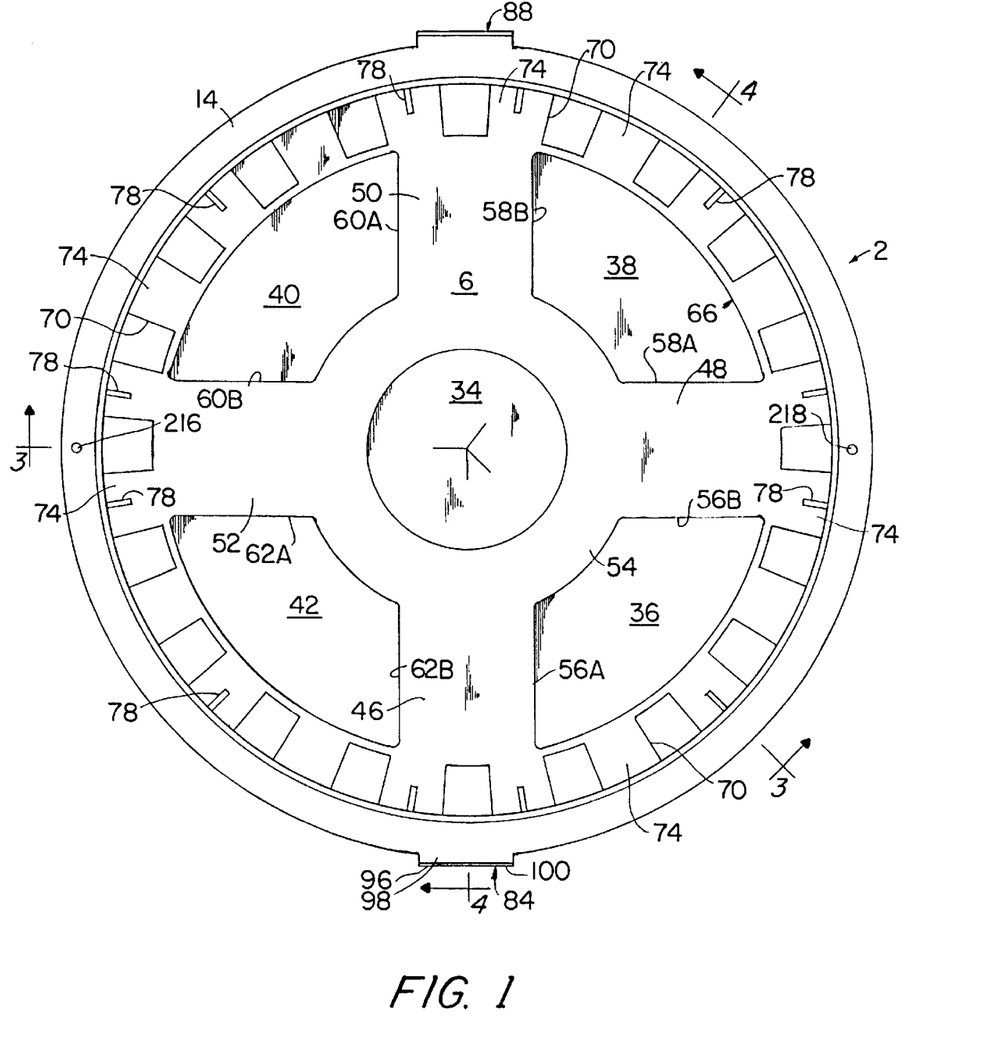
FIG. 1 is a top plan view of a preferred embodiment of the lid of the invention which, together with a pail, comprises the container of the invention.
Figure 2:
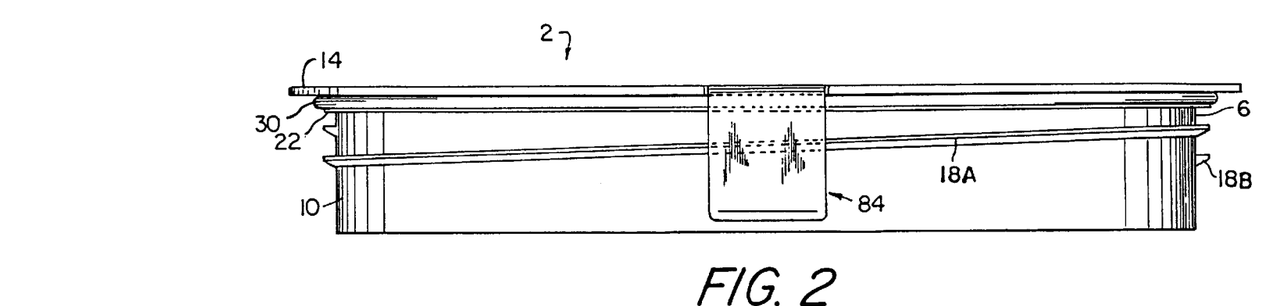
FIG. 2 is a side view of the lid shown in FIG. 1.
Figure 3:
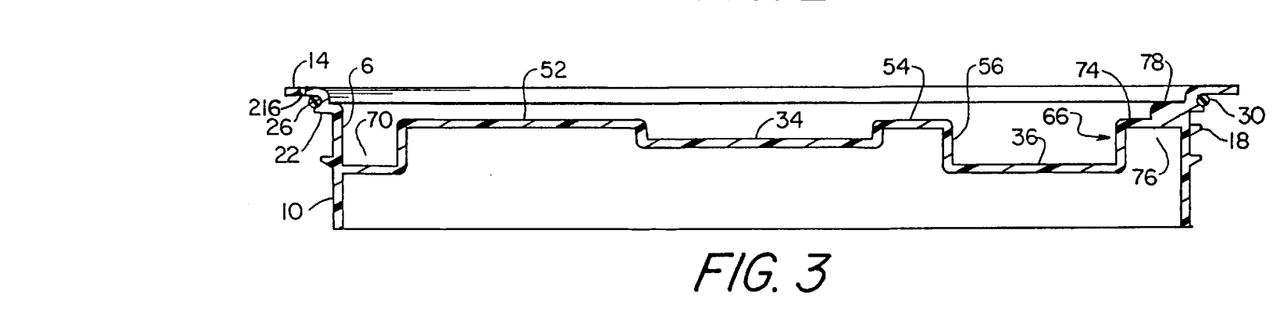
FIG. 3 is a cross-sectional view of the lid taken along line 3—3 of FIG. 1.
Figure 4:
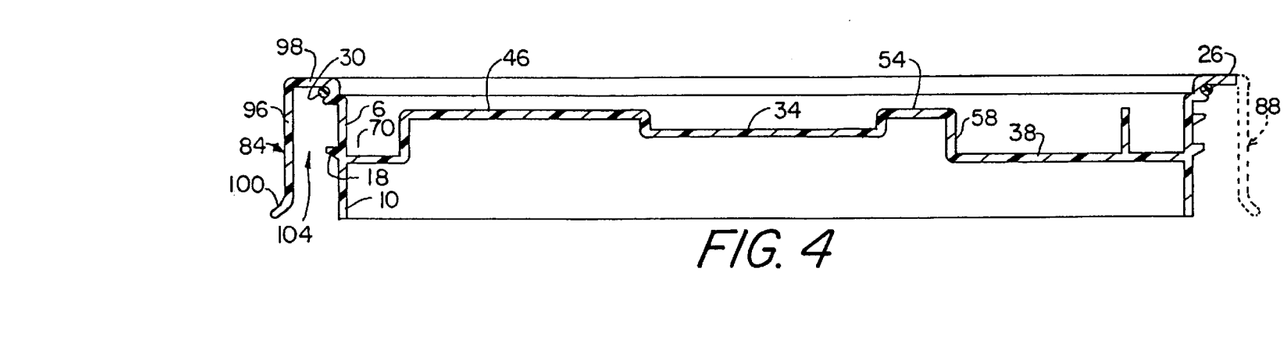
FIG. 4 is a cross-sectional view of the lid taken along line 4—4 of FIG. 1.

Preferably, as seen in FIGS. 1, 3 and 4, the body portion 6 of the lid is formed with a depressed center section 34 and a series of depressed arcuate sections 36, 38, 40 and 42. This construction results in the formation of a series of raised radial arms 46, 48, 50 and 52 extending from an inner ring section 54 (FIGS. 1, 2) adjacent to the depressed section 34 and extending radially outwardly. Preferably, the upper surfaces of these radial arms and the inner ring section lie in the same plane. These radial arms and the inner ring section serve to stiffen the lid, and also act as an alignment means to facilitate the stacking of another container on top of the lid.

Radially-extending walls 56A, 56B (FIGS. 1, 3) are formed at the juncture of depressed section 36 and radial arms 46, 48, together with the inner ring section 54. Similar walls 58A, B, 60A, B and 62A, B are also formed at the junctures of arcuate sections 38, 40 and 42, respectively, and the associated radial arms 48, 50, 52 and 46. Because of this construction, when it is desired to unscrew the lid from its assembled position sealing the contents of the pail, the several radial arms 46, 48, 50 and 52 can serve as handles to be gripped in order to apply force to rotate the lid. Should the lid be very tightly sealed, such as might be the case where a sealing ring 30 is used and/or the container has been not opened for an appreciable length of time, the end of a length of a rectangular cross-section wood board or other rigid flat and straight element may be placed in any of the depressed arcuate sections against one of the walls 56B, 58B, 60B or 62B and physically impacted to exert force to loosen the lid so that it may be unscrewed to remove it from the pail. A similar impacting arrangement involving walls 56A, 58A, 60A or 62A may be employed to tightly reseal the lid when it is reassembled to the pail.

Still referring to FIGS. 1 and 3–5, the sections 36, 38, 40 and 42 terminate radially short of the outer peripheral ledge 14 to form an outer ring or rim section (FIGS. 1, 3). In order to add rigidity to the lid it is preferred that this rim section be formed as a series of circumferentially-spaced alternately-occurring recesses 70 (FIGS. 1, 3, 4) and planar sections or lands 74 (FIGS. 1, 3). The planar sections have the same thickness as the remainder of the main body 6 so that when viewed from the underside (see FIG. 3), a series of recesses 76 are formed under each planar section 74 having substantially the same depth as the recesses 70.

As an optional measure, stacking guides may be added to the outer ledge in the form of a series of ribs 78 (FIGS. 1, 3) which are integral with and project up from some of the planar sections 74. Ribs also are integral with the outer ledge 14.

The lid 2 is securely retained on the container to which it is assembled by a latch means. As seen in FIGS. 1, 2 and 4, the latch means consists of a latch element 84 on the lid which cooperates with a catch (described hereafter) located on the container 110. The lid may have only one latch element 84, since it has been determined that adequate latching is achieved if the lid has a single latch element 84. Nevertheless, the lid may have two latch elements for added safety. In the illustrated embodiment, the lid is provided with a second latch element 88 (FIG. 1) located diametrically opposite to the latch element 84. Preferably, the latch elements are molded as an integral part of the lid. Alternatively, they may be separately formed and subsequently welded or cemented to the lid. Only the latch element 84 is described in detail hereafter, it being understood that latch element 88 is similarly constructed and arranged. Latch elements 84 and 88 are resilient, thus capable of being flexed away from the lid.

Figure 5:
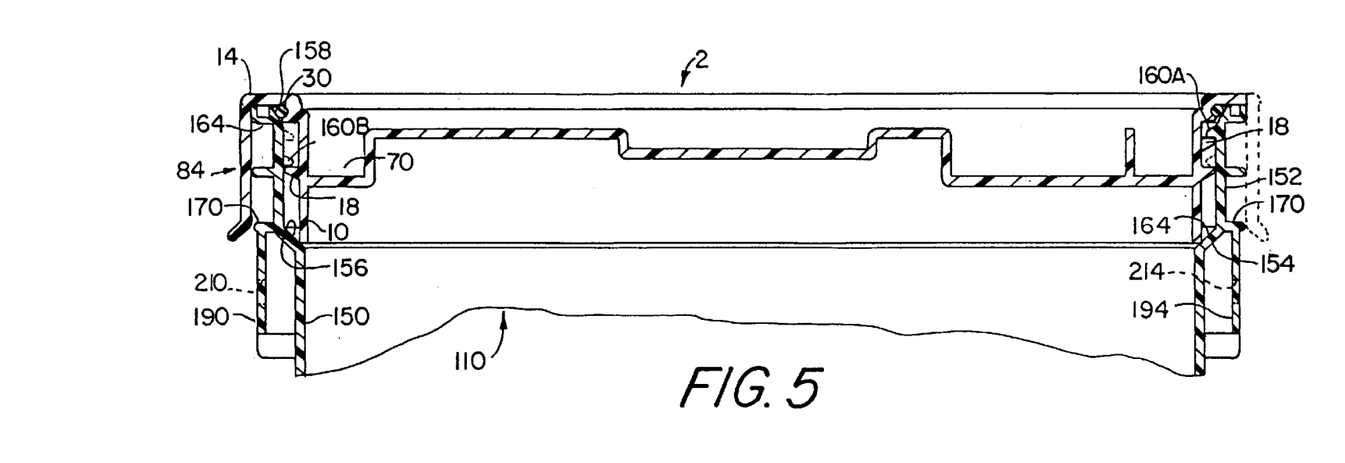
FIG. 5 is a cross-sectional view through the top of a pail constructed in accordance with the teaching of the invention, having internal threads, which is taken along line 5—5 of FIG. 6, and which shows the safety lid of FIG. 4 assembled to the pail to form a container.

As shown in FIGS. 1, 4 and 5, latch element 84 comprises a top radially-extending flange portion 98, a downwardly-extending leg portion 96, and an inclined grip portion 100 (see FIG. 4). Flange portion 98 is integral with ledge 14, and its upper surface is flush with the upper surface of the ledge 14. The leg portion 96 extends downwardly generally parallel to the skirt 10, and the grip portion 100 extends outwardly away from the skirt 10 at an angle to portion 96. There is thus created a channel 104 (FIG. 4) between latch element 84 and skirt 10 to accommodate the upper end of the container 110 (hereinafter described). As seen in FIG. 5, when lid 2 and container 110 are attached to one another, the grip portion 100 is available for gripping.

When it is desired to release the latch means it only requires gripping grip portion 100 and then applying a force to latch element 84 in a direction that flexes the latch element away from skirt 10 and hence away from a position where the latch element may engage a catch (as described in more detail hereafter).

The nature of the locking relationship of the lid with a container is described further hereinafter in connection with FIGS. 5–8 which show a preferred embodiment of a container having a catch for each latch element of the lid.

Figure 6:
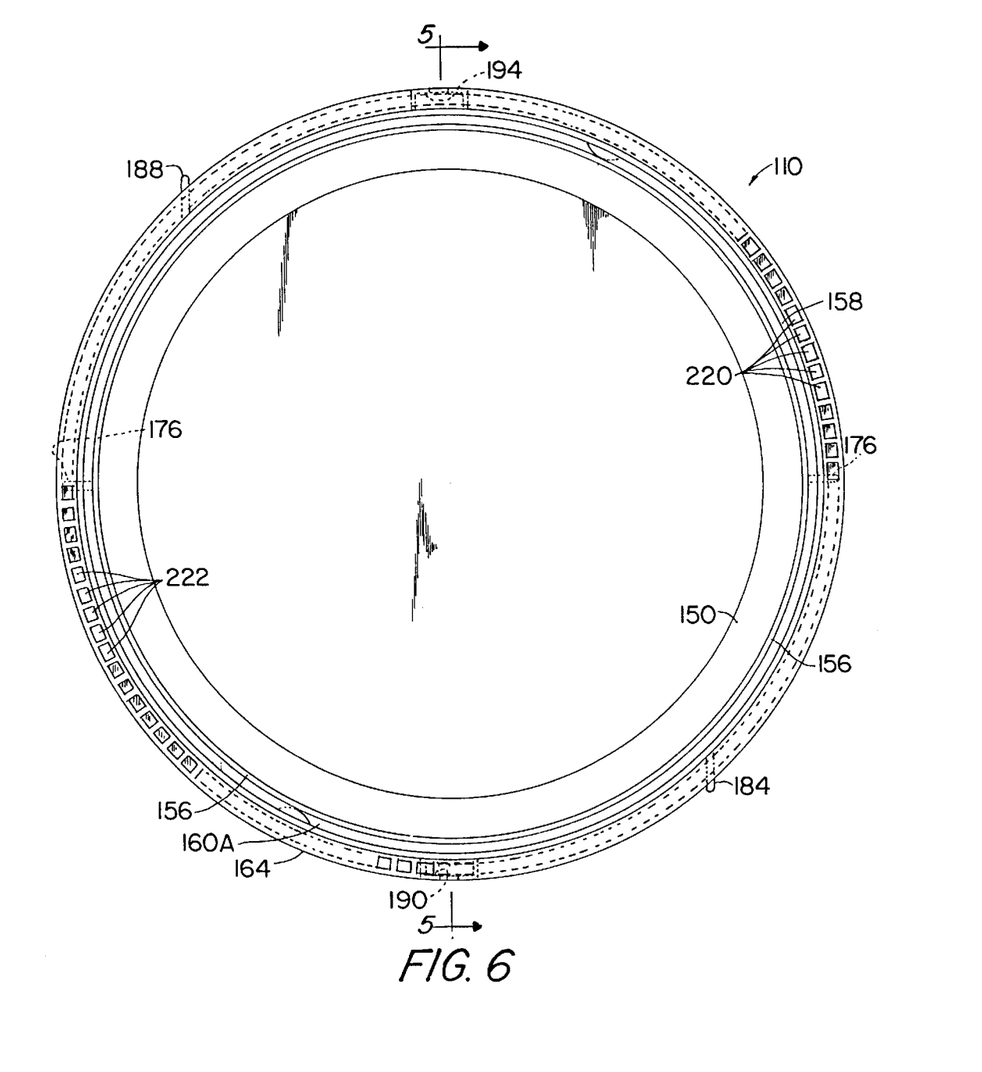
FIG. 6 is a top view of a preferred embodiment of a pail of the invention.
Figure 7:
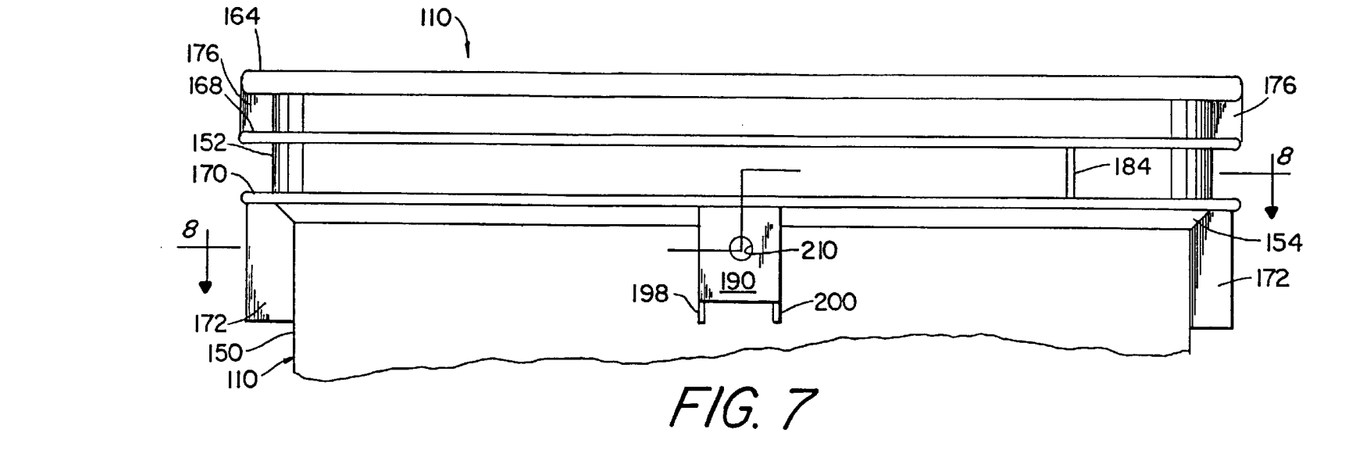
FIG. 7 is a side view of the embodiment of the pail shown in FIG. 6.
Figure 9:
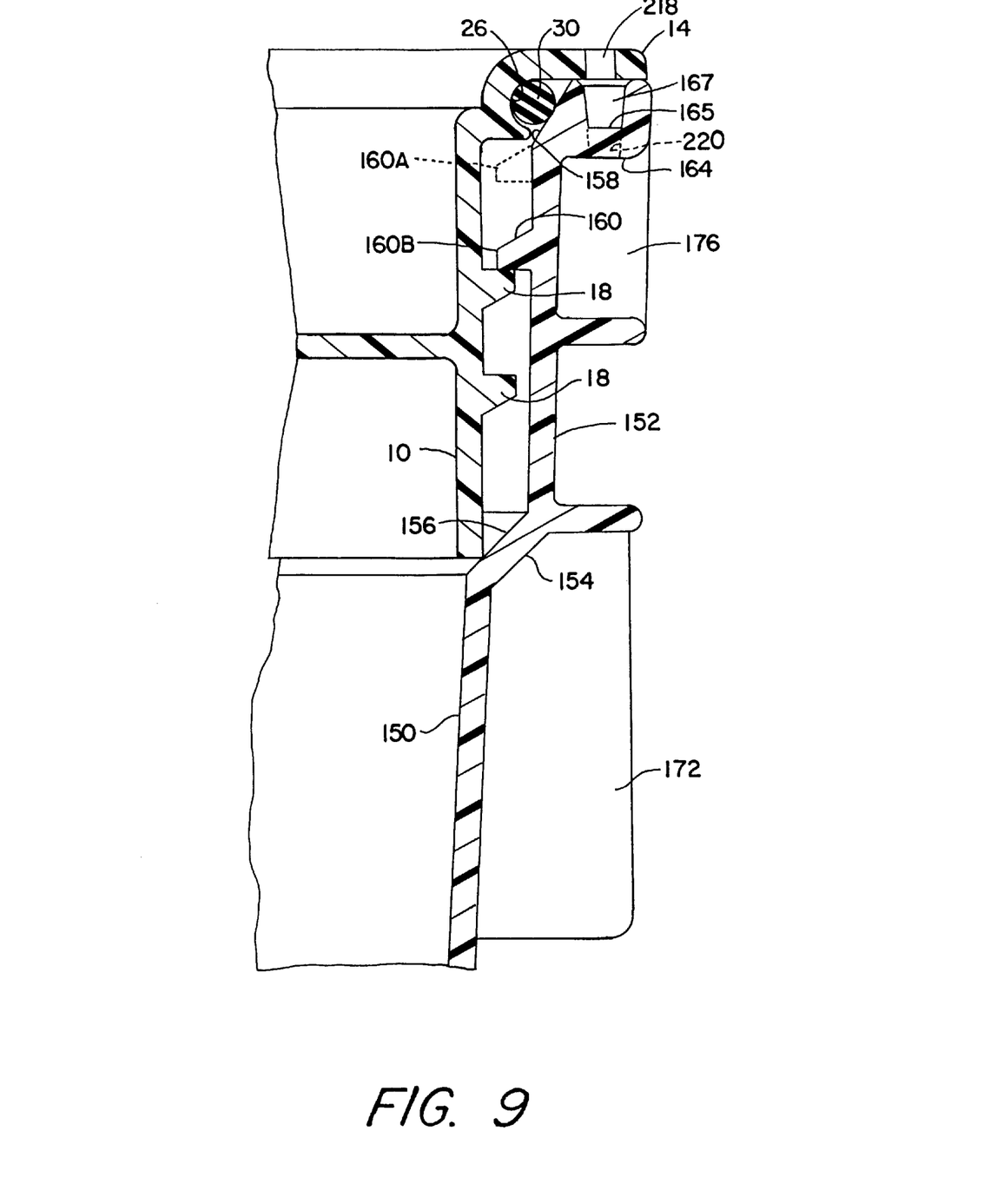
FIG. 9 is an enlargement of a portion of FIG. 5.
Figure 10:
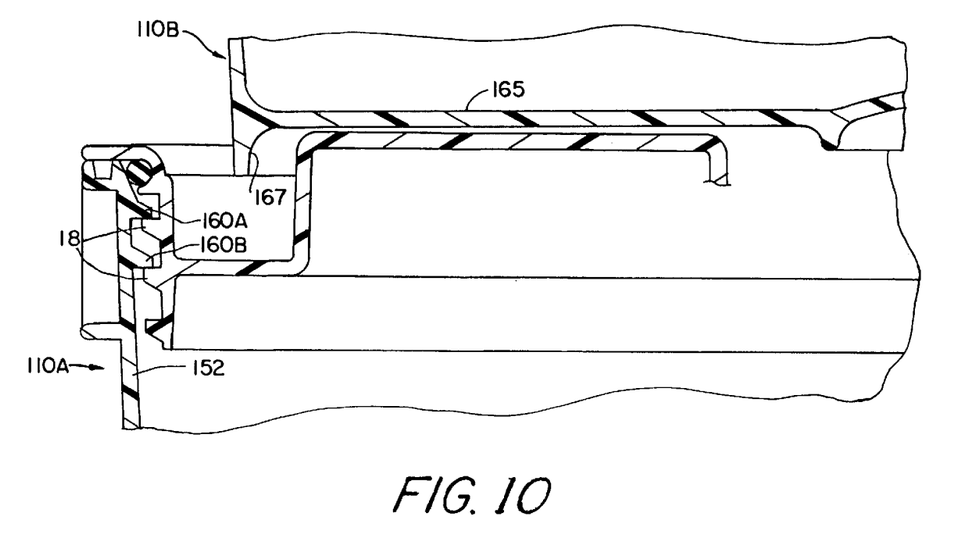
FIG. 10 illustrates how the lids are adapted to facilitate vertical stacking of containers with lids.

As seen in FIGS. 5–10, container (pail) 110 comprises a side wall 150. Preferably, as seen in FIGS. 7, 9 and 10, side wall 150 is tapered inwardly from top to bottom by several degrees, i.e., the o.d. of the bottom end is smaller than the o.d. of the upper end of the pail, so as to permit the pails (without lids) to be stacked one inside the other for storing and shipping purposes. The upper end of the pail is expanded in diameter so as to provide an enlarged diameter side wall portion 152 (FIGS. 7, 9 and 10) that is joined to the side wall 150 by a tapered transition section 154, whereby the inner surface of the pail comprises an annular beveled surface 156 (FIGS. 5, 6 and 9). The upper end of side wall portion 152 has a beveled inner surface 158 (FIGS. 6 and 9) at its upper end for engagement by O-ring seal 30. The upper end of the container also has a peripheral outwardly extending radial flange 164. The upper end of flange 164 is provided with a plurality of depressions 165 demarcated by radially extending webs 167 (FIGS. 6, 9). Depressions 165 and webs 167 are for dual purposes—(1) to facilitate removal of the container from the multi-part mold and (2) to provide greater resistance to distortion of the container.

FIG. 10 shows the bottom end of one container 110B resting on the lid 2 of a second like container 110A. As seen in FIG. 10, the bottom end of container 110B has a bottom end wall 165 and a downwardly-extending peripheral flange 167. The latter has a diameter such that it rests on the lands 74 of lid 2 of second like container 110A. This arrangement permits stacking of containers with the corrugated structure of the lids assuring that the lids can support a superimposed container.

The inner surface of enlarged diameter side wall portion 152 of the container is provided with two "half threads" 160 which are shaped and sized circumferentially to complement and mate with the half threads 18 on the outer surface of lid 2.

The lid is assembled to the pail by engaging the threads 18 on the lid with the threads 160 of the container and rotating the lid clockwise until the underside of the outer ledge 14 of the lid is seated on the upper edge of the upper outer flange 164 of the container. A tight sealing relationship between the lid and the container is provided by engagement of sealing ring 30 with the beveled surface 158 when the lid is assembled to the container. O-ring seal 30 may be slightly compressed when the lid is threaded tightly into the pail to accomplish a tight seal.

The beveled surface 158 also serves a centering or piloting function. As the lid is brought downward towards the top end of the pail for the purpose of assemblage to the pail, the bottom of skirt 10 usually will contact some portion of the beveled surface 158. In such event, the surface 158 will pilot the lid into a centered position where threads 18 can engage the threads 160. This centering or piloting function is particularly useful when segmented threads are employed.

It should be noted that a common industry practice is to apply a plastic screw-type lid to a container by a downward, non-rotating propulsion of the lid towards the container, i.e., by a press-on action. With this invention, such press-on action is permitted by the fact that the lid is made of a resilient material, e.g., polyethylene or polypropylene, and also by the type of threads 18 and 160 that are provided on the lid and container. These threads can be constructed in two, three, four or more segments. In the illustrated embodiment, the threads on the pail are formed in two diametrically opposed segments 160A and 160B (FIGS. 5, 9 and 10) designed to mate with the two half threads 18A, 18B (FIG. 2) on the lid. Since the lid and pail are both made of a resilient material, attaching a screw lid 2 to pail 110 by a simple press-on action to achieve a snap-on connection is made feasible. Referring now to FIGS. 5, 9 and 10, when the lid is attached to the container by downward force fit or by screwing it in place, the lower edge of the skirt 10 may first contact beveled surface 158, and such contact tends to cause the lid to be centered relative to the containers so as to facilitate further downward movement of the lid into the containers. Thereafter the lower edge of skirt 10 tends to come into contact with the beveled surface 156, so as to provide a second sealing engagement between the lid and pail. This latter sealing engagement is not essential but is preferred for this invention.

Preferably, the upper end of container 110 is rigidized by two circumferentially-extending exterior flanges 168 and 170 (see FIG. 7) in cooperation with flange 164. Preferably these flanges are further reinforced by radially-extending ribs 172 which are joined to lowermost flange 170 and wall 150, and radially-extending ribs 176 which are joined to the middle and upper flanges 164 and 168 and wall section 152.

Figure 8:
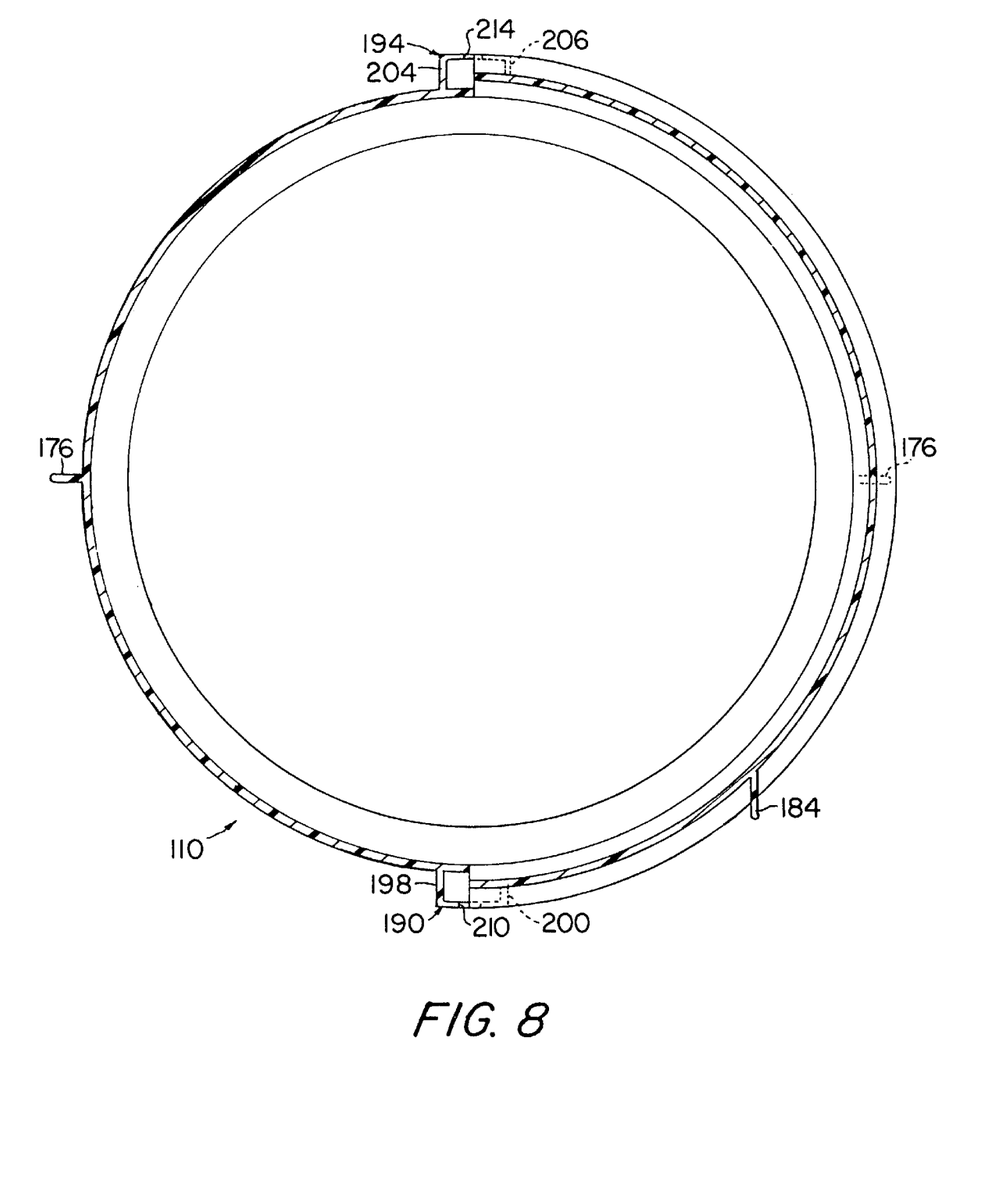
FIG. 8 is a cross-sectional view of the pail taken along line 8—8 of FIG. 7.

The latch elements 84 and 88 on lid 2 cooperate with like catch elements 184 and 188 respectively located on the pail (see FIGS. 6, 7 and 8). As clearly seen in FIG. 8, catch elements 184 and 188 are projections that extend at an acute angle to the outer surface of the container. Catch elements 184, 188 are located between the middle flange 168 and the lower flange 170. Catch element 184 is approximately diametrically opposed to catch element 188 between flanges 168 and 170. With such an orientation, when the lid is to be assembled to the pail, if the lid is rotated clockwise relative to the pail (as viewed in FIG. 6), the latch elements 84 and 88, due to their resiliency, will contact the catch elements 184 and 188 and will be forced outwardly away from the pail so that they can "ride over" the catch elements. The angular orientation of the catch elements 154, 188 is such as to allow them to exert a camming action on the latch elements 84, 184 as the lid is rotated clockwise (as seen in FIGS. 6 and 8), causing the latch elements to move outwardly away from the pail. The latch elements 84 and 88 will again return to the position shown in FIGS. 4 and 5 when clockwise rotation of the lid moves them past the catch elements. However, on counter-clockwise movement of the lid, the catches 184, 188 will interfere with movement of the lid and prevent it from being unscrewed from the container until the latch elements are manually released from the catches. Releasing the catches is accomplished by inserting a finger into the channel 104 and exerting a force to pry the downwardly extending portion 96 of the latch element outwardly while simultaneously rotating the lid counter-clockwise to unthread it from the pail. Where two latch means are employed, such as shown in the preferred embodiment of the drawings, it is necessary to free both latch elements simultaneously from their catch elements in order to permit counter-clockwise rotation of the lid. Such simultaneous movement is rather difficult for a child to accomplish. In this manner a safety feature of the container is provided that makes it difficult for a young child to remove a lid once it is reassembled to a pail.

Provisions are made on the container to allow for the mounting of an arched handle or bail (not shown) on the container. For this purpose, as shown in FIGS. 5, 6, 7 and 8, there is provided a pair of diametrically opposed mounting flanges 190 and 194. The mounting flange 190 is supported by spacing ribs 198 and 200 so that it is spaced outwardly from the pail and lies at the outermost periphery of the pail. Similarly the mounting flange 194 is supported by ribs 204 and 206 so that it is also spaced outwardly from the pail and lies at the outermost periphery of the pail. Holes 210 are provided in the mounting flanges 190 and 194, respectively, to accommodate a bail.

The container of the invention also may be made tamperproof. In this regard, the outer ledge 14 of the lid 2 is provided with at least one hole. Also a plurality of holes is provided in the container for the purpose of assuring that the hole in the lid will match up with one of the holes in the pail. In the preferred embodiment, and as seen in FIGS. 1 and 9, diametrically opposed through holes 216 and 218 are provided in the ledge 14 of the lid. Also the upper flange 114 of the pail is provided with two diametrically opposed series of holes 220 and 222. When the lid is assembled into the pail, hole 216 will register with one of the holes 220 or 222 and hole 218 will register with one of the other holes 220 or 222. A tamper evident metal wire or plastic seal (not shown) can then be passed through the registered pairs of holes 216, 220 (or 218, 222) and secured once the pail is filled with the desired contents. Breaking of the wire or plastic seal will indicate that the container has been opened.

Although a latch means is shown that is conveniently mounted so that its latch element 84 extends outwardly and is spaced from the pail, and cooperates with a catch 174 that also extends outwardly from the pail 110, it is to be understood that other arrangements of latch means can be employed. Thus, for example, the latch element may be formed on the outer ledge 14 of the lid so that it is substantially flush with the skirt 10 and carries a detent which engages a side recess in the pail when the lid is screwed into the pail top, so as to lock the lid to the pail.

Having two latch elements rather than one is not essential. However, having two different catch projections on the pail is desirable whether the lid has one or two latch elements, since the latch would have to pass at least one catch in order to free the lid from the pail. That makes it difficult for a child to remove the lid, thus achieving a higher degree of safety.

The invention lends itself to other modifications. Thus, for example, the container and lid may be modified to accommodate a liquid rather than a solid material in granular or powder form. Also, the container need not be a bucket or pail having a bail-type handle, but instead the container may have no handle or a different type of handle. Also, different forms of screw threads may be used. Also, corrugating the lid (as exemplified by recesses 70 and 76) is not essential, but is preferred for obvious reasons.

These and still other modifications, including reversal of parts and function, may be made within the teaching of the invention without departing from the spirit and scope thereof.

What is claimed is:

1. A lid/container combination comprising:
   a molded plastic lid having a main body portion and a depending skirt portion, said main body portion having an annular ledge on its outer periphery that projects radially outward beyond the outer periphery of said skirt portion, said skirt portion having an external surface and at least one first screw thread on said external surface of said skirt portion; and
   a molded plastic container having an open end, a closed end, and a side wall extending from said open end to said closed end, at least one second screw thread on an inner surface of said container side wall, said at least one second screw thread being adapted to mate with said at least one first screw thread, whereby said lid may be attached to said container by screw engagement of said first and second screw threads, said container also having a peripheral outwardly extending flange at its open end over which said annular ledge extends when the lid is attached to the container, whereby when said lid is screwed onto said container by mutual engagement of said first and second screw threads, said ledge may engage said flange.

2. A container/lid combination according to claim 1 wherein said lid and container each have two threads that qualify as "half threads" as that term is defined in the foregoing detailed description of the invention.

3. The combination of claim 1 wherein said container side wall is further provided with a beveled inner surface that extends inwardly from said flange towards the closed end of said container, said beveled surface being located above said at least one second screw thread on the container side wall, and further including resilient sealing means surrounding a portion of said lid in position to engage said beveled inner surface so as to form a tight seal between said lid and container when said lid is screwed onto said container.

4. The combination of claim 3 wherein said container side wall is provided with a second beveled inner surface located below said at least one second screw thread, said skirt portion on said lid terminating in a bottom end and being of such length that when the lid is completely threadedly assembled to the container the bottom end of the skirt portion will be seated on said second beveled inner surface.

5. A lid/container combination comprising:
   a lid having a main body portion and a depending skirt portion, said skirt portion having an external surface and at least one first screw thread on said external surface of said skirt portion;
   a container having an open end, a closed end, and a side wall with an inner surface extending from said open end to said closed end, at least one second screw thread on said inner surface of said container, said second screw thread being adapted to mate with said first screw thread, whereby said lid may be attached to said container by screw engagement of said first screw thread with said second screw thread, said container also having a flange at its open end upon which a portion of the lid is seated when the lid is attached to the container; and
   a latching means comprising a latch element and a catch element, said latch element being mounted on one of said lid and container and said catch element being mounted on the other of said lid and container, whereby when said lid is assembled to said container, the latch element and catch element will engage one another to provide a latching function to prevent accidental disassembly of the lid from the container.

6. The combination of claim 5 wherein the latch element comprises a flexible arm on said lid and said catch element comprises a detent means on said container, said flexible arm engaging said detent means when said lid is threadedly assembled to the container in such manner that disassembly of the lid from the container cannot occur without flexing said flexible arm in order to disengage it from said detent means.

7. The combination of claim 6 wherein said flexible arm extends downwardly from the periphery of said lid substantially parallel to and spaced from said skirt portion.

8. The combination of claim 7 wherein said container has an outer surface, and further wherein said detent means comprises at least one rib located on said outer surface and extending outwardly therefrom, whereby when it is desired to remove a previously assembled lid from the container the flexible arm on the lid will come into contact with the rib on the outer surface of the container and continued rotation of the lid to remove it from the container is prevented until the arm is flexed outwardly so that contact with the rib is avoided and rotational movement of the lid is again permitted.

9. A container/lid combination according to claim 5 wherein said lid and container each have two threads that qualify as "half threads" as that term is defined in the foregoing detailed description of the invention.

10. A lid/container combination comprising:
    a circular molded plastic lid having a main body portion and a skirt portion formed integral with and depending from said body portion, a circumferentially-extending peripheral ledge formed integral with said body portion, resilient sealing means located on the underside of said ledge, said skirt portion having an external surface, and at least one first screw thread provided on the external surface of said skirt portion; and a molded plastic container having an open end, a closed end and a side wall that extends from said open end to said closed end, said container being provided with a peripheral flange at its open end over which said ledge extends when said lid is assembled to the container, at least one second screw thread provided on an inner surface of said container side wall adjacent its open end, said at least one second screw thread having a complementary configuration to said at least one first screw thread on the skirt portion of said lid, said side wall also having a beveled surface that extends inwardly from adjacent said flange towards the closed end of said container, said beveled surface being located above said at least one second screw thread, whereby said lid may be assembled to said container upon threaded engagement of said first and second screw threads, and upon completion of such assembly the sealing means on the underside of the ledge on said lid will be drawn into engagement with said beveled inner surface of the container so as to form a tight seal between the lid and container.

11. A lid/container combination comprising:

a circular lid having a main body portion and a skirt portion formed integral with and depending from said body portion, a circumferentially-extending peripheral ledge formed integral with said body portion, sealing means located on the underside of said ledge, said skirt portion having an external surface, and at least one first screw thread provided on the external surface of said skirt portion; and a container having an open end and a closed end, said container being provided with a flange at its open end upon which the lid will rest when it is assembled to the pail, said container further having an inner surface extending from said open end to said closed end, at least one second screw thread provided on the inner surface of said container adjacent its open end, said at least one second screw thread having a complementary configuration to the at least one first screw thread on the skirt portion of said lid, a beveled surface on the inner surface of said container extending from said flange towards the inside of said container and located above said at least one second screw thread, whereby said lid may be assembled to said container upon threaded engagement of said first and second screw threads, and upon completion of such assembly the sealing means on the underside of the ledge on said lid will be drawn into engagement the beveled surface on the container to form a tight seal between the lid and container; and a latching means comprising a latch element and a catch element, said latch element being mounted on one of said lid and container, said catch element being mounted on the other of said lid and container, whereby when said lid is assembled to said container the latch element and catch element will engage one another to provide a latching function to prevent accidental disassembly of the lid from the container.

12. The combination of claim 11 wherein said latch element is a flexible arm attached to said lid and said catch element comprises a rib on said container, said rib extending at an acute angle to the outer surface of the container, whereby on rotation of said lid in a first direction said flexible arm will be forced outwardly away from the container by said rib when said flexible arm comes into contact with said rib and on rotation of said lid in a second direction said rib will intercept said arm and prevent said lid from being unscrewed from said container.

13. The combination of claim 12 wherein said container is provided with a second beveled surface located below said at least one second screw thread, said skirt portion having a bottom end and being of such length that when the lid is screwed onto the container said bottom end of the skirt portion will be seated on said second beveled surface.

14. A reusable plastic lid for a container, said lid being circular and comprising a main body portion and a skirt portion formed integral with and depending from said main body portion, said main body portion having a ledge on its periphery, said skirt portion extending below and substantially perpendicular to said ledge, said skirt portion further having an external surface, at least one screw thread on the external surface of said skirt portion, and a latch element for releasably locking said lid to a container, said latch element comprising an arm attached to and depending from said ledge.

15. A lid/container combination comprising:

a circular lid comprising a main body portion and a depending skirt portion terminating in a bottom end, said main body portion being provided with a ledge on its periphery that projects radially beyond the periphery of said skirt portion, said skirt portion having an external surface and a first screw thread on said external surface;

a container having an open end and a closed end, said container being provided with a flange at its open end over which said ledge will extend when said lid is assembled to said container, said container further having inner and outer surfaces that extend from said open end to said closed end, a second screw thread provided on the inner surface of said container adjacent its open end, said second screw thread having a complementary configuration to the first screw thread on the skirt portion of said lid, a first beveled surface on the inner surface of said container extending from said flange towards the inside of said container and located above said second screw thread, a second beveled surface on the inner surface of said container located below said second screw thread, whereby said lid may be assembled to said container upon threaded engagement of the first thread on the skirt with the second screw thread on the container; and latching means comprising at least one resilient latch element and at least one catch element, said at least one latch element comprising a flexible arm mounted on the outer periphery of the ledge on said lid and extending downwardly therefrom substantially parallel to and spaced from the skirt portion thereof, said at least one catch element comprising a rib on the outer surface of the container and extending outwardly therefrom, whereby upon assembly of the lid to the container said at least one resilient flexible arm on the lid will be forced outwardly away from the container as the lid is rotated and the said at least one arm comes into contact with said at least one rib, and upon disassembly of the lid from the container it is necessary to apply force to flex said at least one arm outwardly away from the container outer surface in order to permit said at least one arm to pass by said at least one rib.

16. The lid/container combination of claim 15 wherein said rib extends at an acute angle to the center surface of said container.

17. The lid/container combination of claim 15 further including resilient sealing means carried by said lid on the underside of said ledge, whereby when said lid is assembled to said container said sealing means is engaged with said container.

18. A lid/container combination comprising:

a container having one or more interior screw threads each extending circumferentially of said container a lid having a peripheral flange and a skirt portion adapted to fit within said container, said skirt portion having one or more exterior screw threads each extending circumferentially of said lid;

said exterior screw threads being adapted to mate with said interior screw threads so that rotational movement of said lid relative to said container will cause said interior and exterior screw threads to be engaged so as to lock said lid to said container; and a latching means comprising a latch element mounted on said lid and a catch element mounted on said container, whereby when said lid is attached to said container, said latch element and said catch element will engage one another to provide a latching function to prevent accidental disassembly of the lid from the container.

19. A container/lid combination comprising:

a plastic container having an open end, a closed end, and a side wall with an inner surface extending from said open end to said closed end, at least one first screw thread on said inner surface of said container, and an annular flange on the periphery of said side wall at said open end;

a plastic lid having a main body portion, a depending skirt portion, and a peripheral flange that projects beyond the periphery of said skirt so that it can overlie said annular flange when said lid is attached to said container, said skirt portion having an external surface and at least one second screw thread on said external surface of said skirt portion; said skirt portion being adapted to fit within said open end of said container, and said at least one second screw thread being adapted to mate with said at least one first screw thread, whereby said lid may be attached to said container by screw engagement of said at least one second screw thread with said at least one first screw thread, said lid being made of a resilient plastic material that that allows the lid to be flexed by a manually applied force, whereby said lid can be attached to said container by forcing it down into said open end of said container so as to cause said at least one second screw thread to become engaged with said at least one first screw thread.

20. A container/lid combination according to claim 19 wherein said side wall is circularly shaped in cross-section and includes a tapered wall section, and further wherein said skirt portion substantially engages said tapered wall section when said lid is attached to said container by mutual engagement of said first and second screw threads.

21. A container/lid combination according to claim 19 wherein said lid and container each have two threads that qualify as "half threads" as that term is defined in the foregoing detailed description of the invention.

22. A container/lid combination according to claim 19 wherein a full circumference portion the inner surface of said side wall is slanted inwardly commencing adjacent said top end and extending toward said closed end, and further wherein said lid has means for engaging and making a fluid-tight seal with said slanted portion of said inner surface when said lid is attached onto said container.

23. A container/lid combination according to claim 19 wherein said container also is made of a resilient plastic material.

24. A container/lid combination according to claim 19 further including cooperating means on said flanges for locking said lid to said container.

25. A container/lid combination according to claim 24 wherein aid cooperating means comprises holes in said flanges for accommodating a metal or plastic wire seal.

26. A container/lid combination comprising a container having an open end, a closed end, and a circularly shaped side wall with an inner surface extending from said open end to said closed end, at least one first screw thread on said inner surface of said container; and a lid having a main body portion and a depending skirt portion, said skirt portion having an external surface and at least one second screw thread on said external surface of said skirt portion; said skirt portion being adapted to fit within said open end of said container, and said at least one second screw thread being adapted to mate with said at least one first screw thread, whereby said lid may be attached to said container by screw engagement of said at least one second screw thread with said at least one first screw thread;

a latch member that extends down alongside of said circularly shaped wall; and a catch member carried by said container in position to be engaged by said latch member.

* * * * *

UNITED STATES PATENT AND TRADEMARK OFFICE
CERTIFICATE OF CORRECTION

PATENT NO. : 5,944,214
DATED : August 31, 1999
INVENTOR(S) : Rino Conti et al

It is certified that error appears in the above-indentified patent and that said Letters Patent is hereby corrected as shown below:

Claim 19, column 11, line 42, delete the word "that" (second occurrence); and

Claim 25, column 12, line 25, change the word "aid" to -- said --.

Signed and Sealed this

Eighth Day of February, 2000

Attest:

Q. TODD DICKINSON

Attesting Officer

Commissioner of Patents and Trademarks